United States Patent
Yamada (10) Patent No.: US 8,534,740 B2
(45) Date of Patent: Sep. 17, 2013

(54) SADDLE-RIDING TYPE AUTOMOTIVE VEHICLE

(75) Inventor: Masashi Yamada, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 13/598,346

(22) Filed: Aug. 29, 2012

(65) Prior Publication Data

US 2013/0057016 A1     Mar. 7, 2013

(30) Foreign Application Priority Data

Sep. 6, 2011  (JP) ................................. 2011-193865

(51) Int. Cl.
*B62J 17/02*     (2006.01)

(52) U.S. Cl.
USPC ......................................... 296/78.1; 296/208

(58) Field of Classification Search
USPC ................................ 296/78.1, 208; 180/68.1
See application file for complete search history.

(56) References Cited

U.S. PATENT DOCUMENTS

| 7,399,029 B2 | 7/2008 | Takeshita |
| 7,510,229 B2 * | 3/2009 | Katagiri et al. ............... 296/78.1 |
| 2007/0024089 A1 | 2/2007 | Takeshita |

FOREIGN PATENT DOCUMENTS

| EP | 2042415 A1 * | 4/2009 |
| EP | 2394893 A2 * | 12/2011 |
| JP | 2006-213249 | 8/2006 |

* cited by examiner

*Primary Examiner* — Dennis Pedder
*Assistant Examiner* — Beverly Becker (57) ABSTRACT

A motorcycle of a type having its front region covered with a fairing has an outer side surface of the fairing formed with a guide groove extending from a location in the vicinity of a front end of the fairing to a location downwardly of a grip of a handlebar then held at the zero steering angle. The guide groove guides the incoming air towards a position forwardly of and in the vicinity of the grip and then deflects the incoming air at the position forwardly of and in the vicinity of the grip so that the incoming air can be guided outside the motorcycle body.

8 Claims, 10 Drawing Sheets

SADDLE-RIDING TYPE AUTOMOTIVE VEHICLE

CROSS REFERENCE TO THE RELATED APPLICATION

This application is based on and claims Convention priority to Japanese patent application No. 2011-193865, filed Sep. 6, 2011, the entire disclosure of which is herein incorporated by reference as a part of this application.

BACKGROUND OF THE INVENTION

1. Field of the Invention

The present invention relates to a saddle-riding type automotive vehicle, such as, for example, a motorcycle, of a type having a front portion enclosed by a fairing.

2. Description of Related Art

JP Laid-open Patent Publication No. 2006-213249 discloses a saddle-riding type automotive vehicle such as, for example, a motorcycle, of a kind in which a front region of the motorcycle body is covered with a fairing for protecting the motorcycle rider from the incoming wind or air, which fairing is provided with a passage for the incoming air in order to control the flow of the incoming air. According to this publication, a guide passage is provided in an outer side surface of the front fairing so that the incoming air guided by this guide passage can guide a radiator ventilating airstream, which has cooled the radiator, in a direction laterally outwardly of the motorcycle body, allowing it to flow in a rearwardly downward direction to thereby prevent the airstream of elevated temperature, coming from the radiator, from impinging on a leg of the motorcycle rider.

It has, however, been found that with the ventilating passage of the structure disclosed in the above mentioned laid-open patent document, the incoming air guided through the ventilating passage flows along the motorcycle body and, therefore, it may impinge upon arms of the motorcycle rider, then gripping the handlebar, enough to disturb pleasant and comfortable motorcycle maneuvering.

SUMMARY OF THE INVENTION

In view of the foregoing, the present invention has been devised to substantially eliminate the above described problems and inconveniences inherent in the prior art and is intended to provide a saddle-riding type automotive vehicle of a type, in which impingement of the incoming air upon arms of the motorcycle rider is alleviated.

In order to accomplish the foregoing object of the present invention, the present invention provides a saddle-riding type automotive vehicle of a type having a fairing enclosing a front region of the automotive vehicle, in which a guide groove is defined in an outer side surface of the fairing and extending from a position in the vicinity of a front end of the fairing to a position below a grip of a handlebar then held at a zero steering angle; and in which the guide groove is operable to guide the incoming air towards a position forwardly of and in the vicinity of the grip in a direction parallel to a longitudinal sense of the automotive vehicle and then to change the flow of the incoming air at the position forwardly of and in the vicinity of the grip to thereby guide it outwardly of the automotive vehicle.

According to the structural feature, by changing the direction of flow of the incoming air, then flowing in and along the guide groove towards the grip, at the location forwardly of and in the vicinity of the grip, as compared with the case in which the direction of flow of the incoming air is changed at a location forwardly of the guide groove, that is, in the vicinity of a front end of the fairing, the incoming air flowing in and along the guide groove can be effectively pushed in a direction laterally outwardly of the motorcycle body at the location in the vicinity of the grip. Accordingly, since the incoming air flowing outside the guide groove can as well be deflected outwardly, the possible impingement of the incoming air upon the rider's arm can be relieved.

In a preferred embodiment of the present invention, in a transverse section perpendicular to the longitudinal sense of the automotive vehicle, a vehicle widthwise outer end face at a site in the fairing, where the guide groove is formed, is bulged in a direction laterally outwardly and gradually from a front end thereof in a rearward direction; the depth of the guide groove as measured in a direction widthwise of the automotive vehicle is so chosen that the depth of a front half portion of the guide groove increases gradually from a front end in the direction rearwardly of the automotive vehicle with the maximum depth being attained at the deepest groove area positioned forwardly of and in the vicinity of the grip; the depth of a rear half portion of the guide groove decreases gradually from the deepest groove area in the direction rearwardly of the motorcycle body; and a guide face is formed at a location rearwardly of the deepest groove area of the guide groove, which guide face is oriented outwardly downwardly.

According to the feature described above, since the guide groove has its depth varying in correspondence with the bulging of the fairing, the incoming air guided by and along the guide groove is suppressed from flowing in the direction laterally outwardly of the vehicle body before it reaches the deepest groove area, and once it passes the deepest groove area, the incoming air is suddenly guided in that direction laterally outwardly of the vehicle body. Accordingly, the direction of flow of the incoming air can be suddenly changed, and as a result, the possible impingement of the incoming air upon the rider's arm can further be relieved.

Particularly where the guide face is so formed as hereinabove described, it is preferred that a deflecting surface is formed forwardly of the guide groove, the deflecting surface extending diagonally rearwardly from an inner side towards an outer side and depressed rearwardly. According to this feature, the incoming air entering the guide groove decrease in its amount because of the deflecting surface and, as a result, the incoming air flowing towards the rider's arm is also reduced, thus relieving the possibility of the incoming air impinging upon the rider's arm.

In another preferred embodiment of the present invention, the guide groove is preferably so formed as to represent a shape generally similar to the inverted shape of a figure "V" when viewed from side; the guide groove being made up of the front half portion extending at a location forwardly of and in the vicinity of the grip, the rear half portion so inclined as to form an obtuse angle relative to the front half portion, and a connecting portion connecting the front half portion and the rear half portion together and having an apex. An inner surface of at least the rear half portion of the guide groove has the guide face oriented outwardly downwardly.

According to the feature described above, if that portion of the incoming air guided by and along the guide groove is guided towards the rear half portion, it is possible to guide that portion of the incoming air in a direction far away from the grip. Also, since the guide face is formed in the rear half portion of the inverted V-shaped configuration, the incoming air can be guided by the guide face in the direction rearwardly downwardly, that is, away from the grip in the downward direction, the possible impingement of the incoming air upon the rider's arm can be effectively relieved.

Particularly where the guide groove is so formed as to represent the shape generally similar to the inverted shape of a figure "V", in the rear half portion a bottom of the guide groove is inclined laterally outwardly of the automotive vehicle in a rearward direction. According to this feature, if the incoming air introduced into the rear half portion of the guide groove is guided towards the outside so that the incoming air emerging outwardly from the guide groove can flow in a direction far away from the rider, the possible impingement of the incoming air upon the rider's arm can be further relieved.

Also, particularly where the guide groove is so formed as to represent the shape generally similar to the inverted shape of a figure "V", a rear portion of the guide groove is preferably oriented downwardly of a rider's knee.

According to this feature, the possible impingement of the incoming air upon not only the arm, but also the knee is relieved.

In a further preferred embodiment of the present invention, the fairing includes a bulged portion bulged outwardly to prevent the incoming air from impinging on a rider's lower thigh. According to this feature, the possible impingement of the incoming air upon the knee is further relieved. In this context the term "lower thigh" refers to a portion ranging from the knee to the ankle.

In a still further preferred embodiment of the present invention, an air discharge opening is formed in a side portion of the fairing; a rectifying fin is provided so as to bridge over the discharge opening to rectify and guide a discharged wind from the air discharge opening in a rearward direction across the air discharge opening; and the rectifying fin has a front end inserted in a slit provided in an edge portion of the air discharge opening. According to this feature, not only can the turbulent flow of the discharged wind during the travel be reduced by the rectifying fin, but also the flow of the discharged wind towards the rider during the halt can be suppressed. Also, since the rectifying fin referred to above has its front end inserted into the corresponding slit provided in the edge portion of the air discharge opening, the occurrence of a turbulent flow in the incoming air then flowing along the outer surface of the fairing can be suppressed by the front end of the rectifying fin.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

A preferred embodiment of the present invention will now be described in detail with particular reference to the accompanying drawings.

Figure 1:
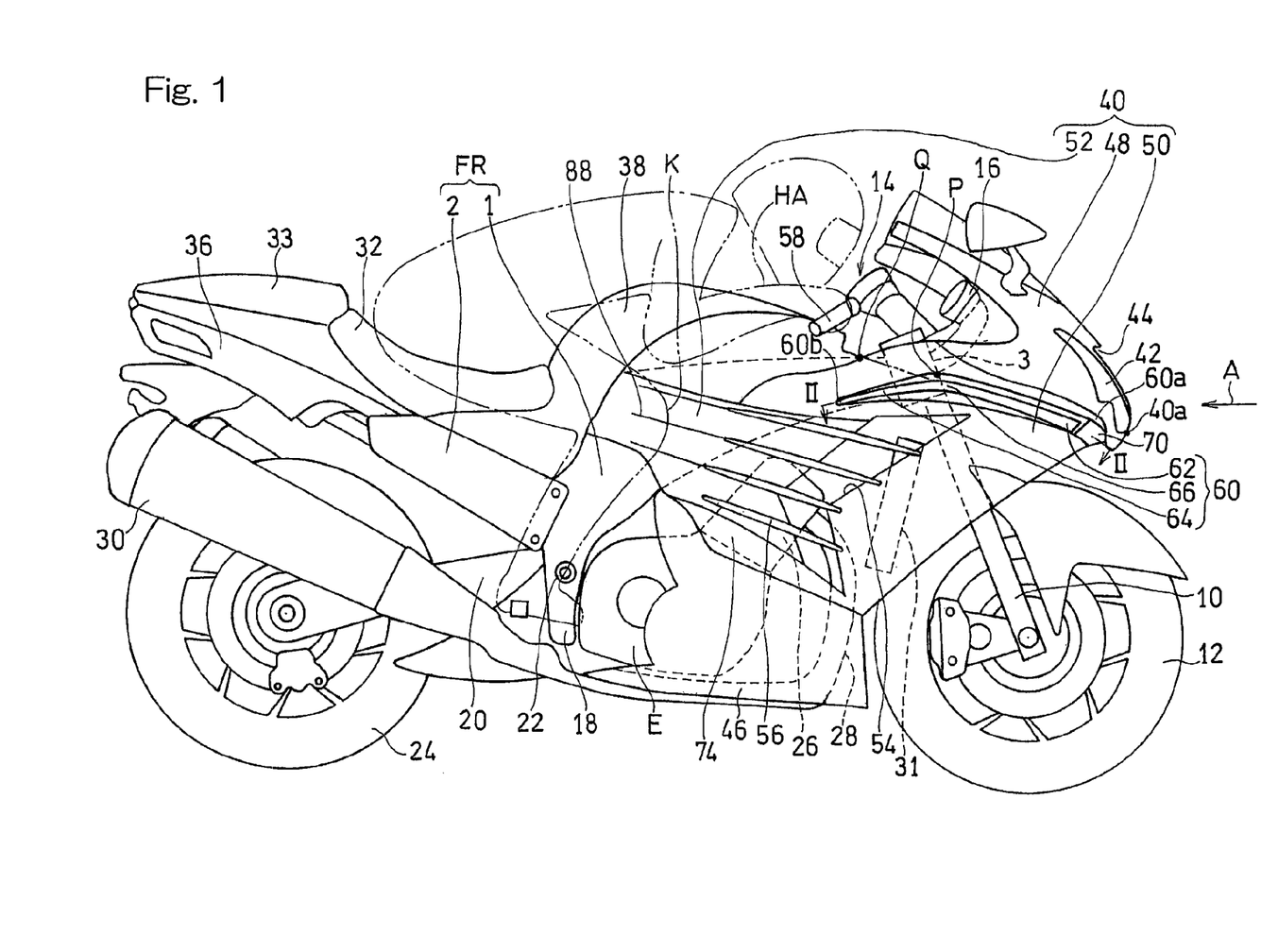
FIG. 1 is a side view showing a motorcycle, which is a sort of saddle-riding type automotive vehicle designed in accordance with a preferred embodiment of the present invention.

FIG. 1 illustrates a motorcycle to which the present invention is applied. A motorcycle frame structure FR includes a main frame assembly 1, forming a front half of the motorcycle frame structure FR, and a rear frame assembly 2 connected with a rear portion of the main frame assembly 1 and forming a rear half of the motorcycle frame structure FR. A head tube 3 is fitted to a front end portion of the main frame assembly 1, and a front fork assembly 10 is supported through a steering shaft (not shown) rotatably inserted in the head tube 3. The front fork assembly 10 has a lower end portion rotatably supporting a front wheel 12. A handlebar 14 and an instrument unit 16, including various gauges such as, for example, a speed meter and an engine tachometer are rigidly mounted on an upper end portion of the front fork assembly 10.

The main frame assembly 1 has a rear portion provided at its lower area with a swingarm bracket 18, and a swingarm 20 is supported by the swingarm bracket 18 for movement up and down relative to the swingarm bracket 18 through a pivot pin 22 that is inserted in a front end portion of the swingarm 20. A rear wheel 24 is rotatably supported at a rear end portion of the swingarm 20. A motorcycle multicylinder combustion engine E is mounted on a lower intermediate portion of the main frame assembly 1, and the combustion engine E has a cylinder head 26 with which a plurality of exhaust pipes 28 are fluidly connected. Those exhaust pipes 28 are in turn fluidly connected with left and right mufflers 30 each positioned on one side of a rear portion of the motorcycle body. A radiator 31 for cooling an engine coolant water by the aid of the incoming air A is disposed at a location forwardly of the combustion engine E with respect to the direction of forward travel of the motorcycle.

A motorcyclist's seat (rider's seat) 32 and a fellow passenger's seat 33 are supported on the rear frame assembly 2. Left and right portions of the rear frame assembly 2 laterally below the rider's and fellow passenger's seats 32 and 33 are enclosed by a tail covering 36. A fuel tank 38 is mounted on an upper portion of the main frame 1 and generally intermediate between the handlebar 14 and the rider's seat 32. Also, a front region of the motorcycle body is covered by a fairing 40 made of a resinous material, which fairing 40 enclosing simultaneously a region of the motorcycle body forwardly of the handlebar 14 and left and right regions laterally of the motorcycle body. The fairing 40 has a headlamp unit 42 mounted thereon, and an air intake opening 44 is defined in a portion of the fairing 40 above the headlamp unit 42 for introducing an air for combustion use therethrough towards the combustion engine E. Provided below the fairing 40 are left and right engine coverings 46 each positioned on a left or right side portion of the exhaust pipes 28 and a left or right lower side portion of the combustion engine E.

The fairing 40 referred to above includes an upper panel 48 for covering an upper forward region of the motorcycle body and having a mounting opening for the headlamp unit 42 and the air intake opening 44 defined therein. The fairing 40 further includes left and right side panels 50 each continued downwardly from a lower portion of the upper panel 48 and covering a region encompassing a front lower portion of the motorcycle body and laterally of the main frame 1 and the radiator 31, and left and right knee grip covers 52 each continued from a rear portion of the respective side panel 50 and covering a region laterally of the motorcycle body.

Figure 3:
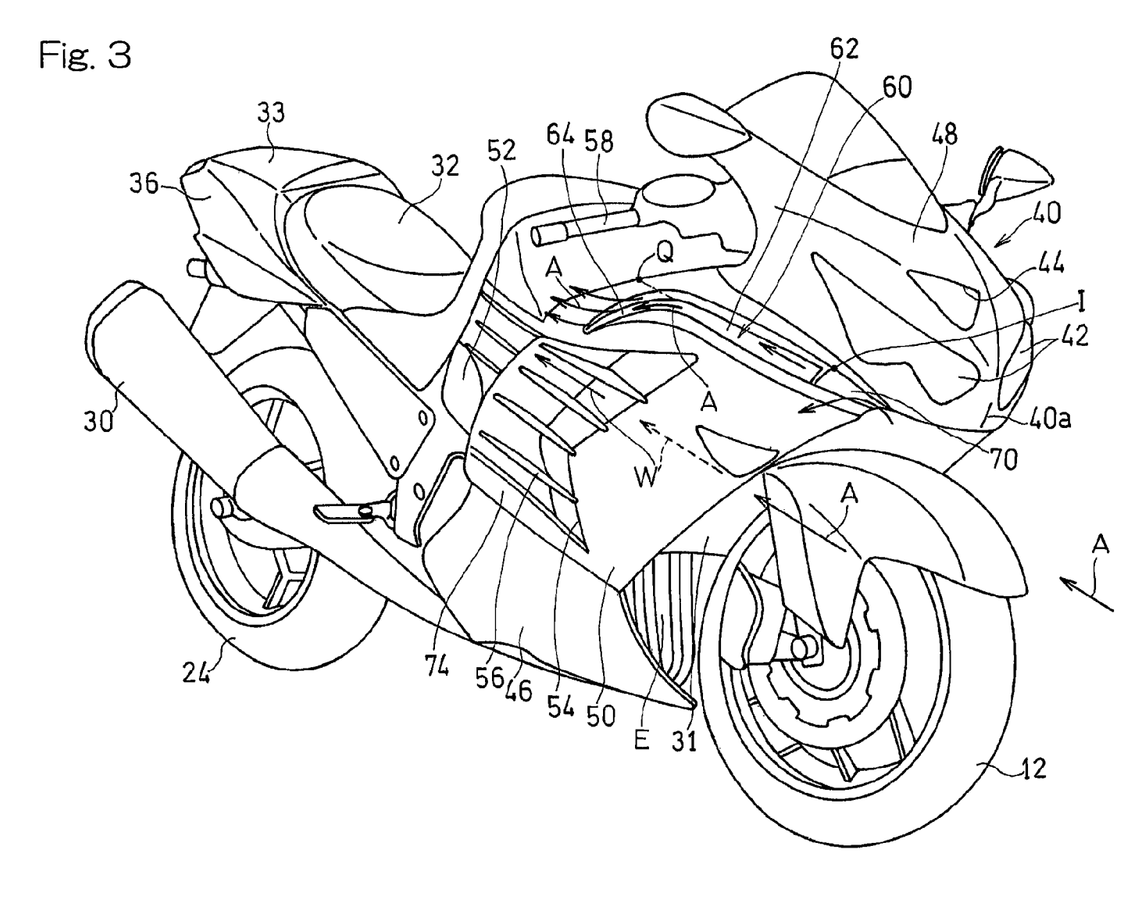
FIG. 3 is a perspective view, as viewed from front, showing the motorcycle.

Respective side portions of the fairing 40 generally intermediate between the side panels 50 and the knee grip covers 52 are formed with air discharge openings 54 defined therein for discharging associated portions of the incoming air A which have flown past the radiator 31 and the combustion engine E, and each of the knee grip covers 52 is formed with a plurality of rectifier fins 56 bridging over the air discharge opening 54 to rectify and rearwardly guide the air to be discharged to the outside through the air discharge opening 54 across the air discharge opening 54. In the illustrated embodiment, four rectifying fins 56 are shown as positioned one above the other and extending generally or substantially parallel to each other in a direction somewhat upwardly rearwardly with respect to the motorcycle body, but the number of those rectifying fins 56 may not be necessarily limited to four as shown. As shown in FIG. 3, as the incoming air A flowing laterally outwardly each of the side cowls 50 flows straight along the rectifying fins 56 traversing in a direction substantially parallel to the longitudinal sense of the motorcycle, a discharged wind W flowing outwardly from the air discharge opening 54 during the travel of the motorcycle is drawn in the incoming air A, which has been rectified, to minimize turbulent flow and, also, to refrain the discharged wind W from flowing upwardly from the air discharge opening 54 towards the rider, then occupying the rider's seat 32, during the halt of the motorcycle.

Figure 2:
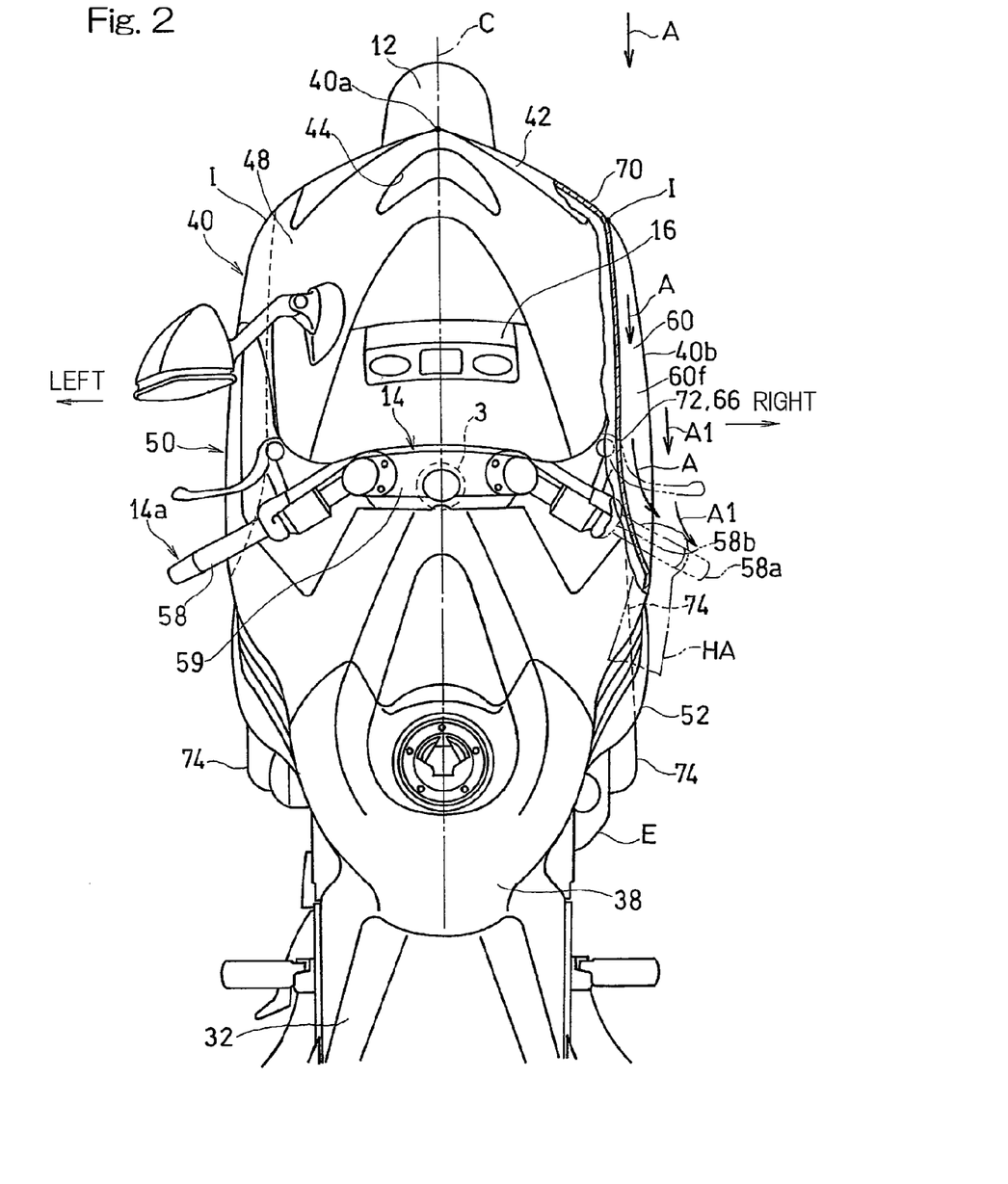
FIG. 2 is a fragmentary top plan view showing a front region of the motorcycle, which view includes a cross sectional view of a portion of the motorcycle taken along the line II-II in FIG. 1.

As best shown in FIG. 2 illustrating a top plan view including a cross sectional view taken along the line II-II extending in a lengthwise direction of a guide groove 60 on each side of the motorcycle body, the handlebar 14 is comprised of left and right handle bars 14a that are inclined relative to each other so as to depict a shape generally similar to the inverted shape of a figure "V" that converge towards the longitudinal center line C of the motorcycle, and each handle bar 14a has an outer free end formed with a corresponding grip 58. Respective outer end portions of the left and right grips 58 on the handle bars 14a protrude laterally outwardly from outer side faces of the fairing 40 when and so long as the steering angle is zero as shown in FIG. 2. On the other hand, respective inner ends of the handle bars 14a are fixed to an upper bracket or a top bridge 59 supported by the head tube 3. The instrument unit 16 referred to previously is disposed forwardly of the top bridge 59.

As shown in FIG. 1, an outer side surface of the fairing 40, more specifically an outer side surface of an upper portion of each of the side panels 50, is formed with the guide groove 60 so as to extend from a position in the vicinity of a front end 40a of the fairing 40 to a position beneath the adjacent grip 58 of the handlebar 14 then held at a position corresponding to the zero steering angle. The guide groove 60 in each of the side panels 50 has a front end 60a positioned substantially immediately below a rear end of the headlamp unit 42 mounted on the fairing 40 and, also, has a rear end 60b positioned substantially immediately below an outer end 58a of the adjacent grip 58 of the handlebar 14 then held at the position corresponding to the zero steering angle (during the straight forward travel of the motorcycle).

The guide groove 60 is so formed as to represent a shape generally similar to the inverted shape of a figure "V", when viewed from side, and is made up of a front half portion 62 substantially inclined so as to extend somewhat rearwardly upwardly towards the adjacent grip 58 to a position forwardly of and in the vicinity of such grip 58, a rear half portion 64 inclined so as to form an acute angle relative to the front half portion 62 to thereby extend rearwardly downwardly, and a connecting portion 66 connecting the front half portion 62 and the rear half portion 64 together to define an apex P of the V-shape. The rear half portion 64 of the guide groove 60 is directed downwardly beneath a knee K of a motorcycle rider then occupying the rider's seat 32.

The term "position forwardly of and in the vicinity of the grip 58" referred to above and hereinafter means a position rearwardly of the instrument unit 16 or the top bridge 59 at the front portion of the motorcycle body and forwardly or below an inner end portion 58b of each of the left and right grips 58 which is the frontmost end of the respective grip 58. The details of the shape of the guide groove 60 in each of the side panel 50 will be described later.

As shown in a perspective view in FIG. 3, a lower portion of each of the side panels 50 has a bulged portion 74 defined therein so as to protrude laterally outwardly beyond the remaining portion of each side panel 50. This laterally outwardly bulged portion 74 serves to prevent the incoming air A from impinging upon a corresponding lower thigh of the motorcycle rider, then occupying the rider's seat 32, and extends upwardly in a rearward direction from a front end thereof. As best shown in FIG. 1, the bulged portion 74 has a rear portion positioned at a location in the vicinity of and forwardly of the corresponding leg of the motorcycle rider then occupying the rider's seat 32 to alleviate a wind blast on the rider's leg.

Also, a deflecting surface 70 made up of a concave extending substantially diagonally rearwardly in a direction outwardly of the motorcycle body is formed at a location forwardly of the guide groove 60 on each side of the motorcycle body in an inner side of the motorcycle body. This deflecting surface 70 is used to guide a corresponding portion of the incoming air A, then impinging upon the front end 40a of the fairing 40, towards an outer side of the motorcycle body and has, as best shown in FIG. 2, an outer surface somewhat depressed rearwardly.

Figure 4:
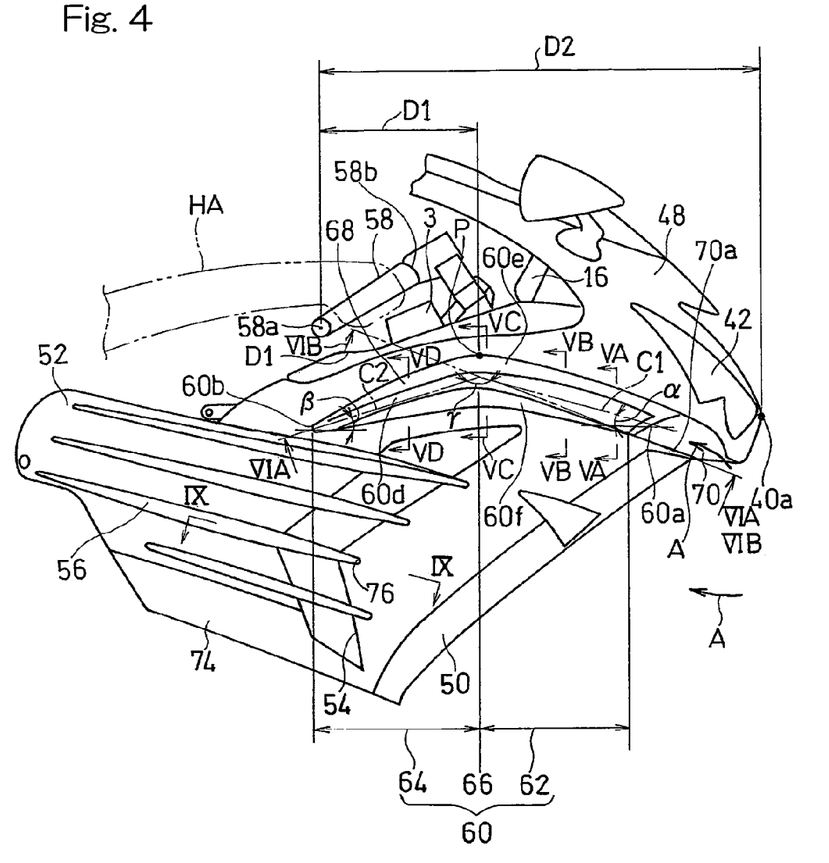
FIG. 4 is a side view showing a fairing employed in the motorcycle.

As shown in an enlarged side view in FIG. 4, the rear half portion 64 of the guide groove 60 has an inner surface provided with a laterally outwardly and downwardly oriented guide face 68. In other words, the guide groove 60 on each side of the motorcycle body is so operable that the incoming air A can be guided by the front half portion 62 of such guide groove 60 in a direction longitudinally of the motorcycle to the position forwardly of and in the vicinity of the corresponding grip 58 and can be subsequently guided to flow rearwardly below the motorcycle body towards the lateral outside of the motorcycle body after the direction of flow of the incoming air A has been changed by the rear half portion 64 of such guide groove 60 at the position forwardly of and in the vicinity of the grip 58. In the illustrated embodiment, the guide face 68 referred to above is provided in the inner face of the rear half portion 64 of the guide groove 60, but it may be provided in an inner face of a rear segment of the front half portion 62 in addition to the inner face of the rear half portion 64.

When viewed from side, the distance D1 as measured from the outer end 58*a* of each of the handle bars 14*a* of the handlebar 14 to the apex P in the direction longitudinally of the motorcycle is preferably ½ or smaller than the distance D2 as measured from the outer end 58*a* of the respective handle bar 14*a* thereof to the front end 40*a* of the fairing 40. If the ratio of D1/D2 is greater than ½, a front end of the guide face 68 of the associated guide groove 60 is positioned too forwardly and, therefore, the incoming air A, once directed by the guide face 68 so as to flow outwardly, will be brought backwards enough to allow the incoming air A to be apt to impinge upon the rider's hand, then gripping the grip 58 and the rider's arm HA. When viewed from side, the angles of inclination α and β defined by groove center lines C1 and C2, extending along respective lengthwise direction of the front half portion 62 and the rear half portion 64, relative to the longitudinal direction are within the range of, for example, 10 to 20° and 10 to 25°, respectively and the angle of crossing γ between the groove center lines C1 and C2 is an obtuse angle within the range of 135 to 160°. It is, however, to be noted that the front half portion 62 of each of the grooves 60 may extend in a direction substantially parallel to the longitudinal sense of the motorcycle (i.e., at the zero angle α).

As best shown in FIG. 2, at a site in the longitudinal direction of the fairing 40, where the guide groove 60 is formed, a motorcycle widthwise outer end face 40*b* is bulged laterally outwardly in the widthwise direction of the motorcycle body and gradually from the front end in the direction rearwardly of the motorcycle body. The guide groove 60 on each side of the motorcycle body has a transverse sectional shape, as viewed in a direction perpendicular to the longitudinal direction of the guide groove 60, which represents a generally trapezoidal or V-shaped configuration as shown in FIGS. 5A to 5D. The guide groove 50 has an inner surface made up of a bottom face 60*d*, an upper groove face 60*e* and a lower groove face 60*f*.

Figure 5A:
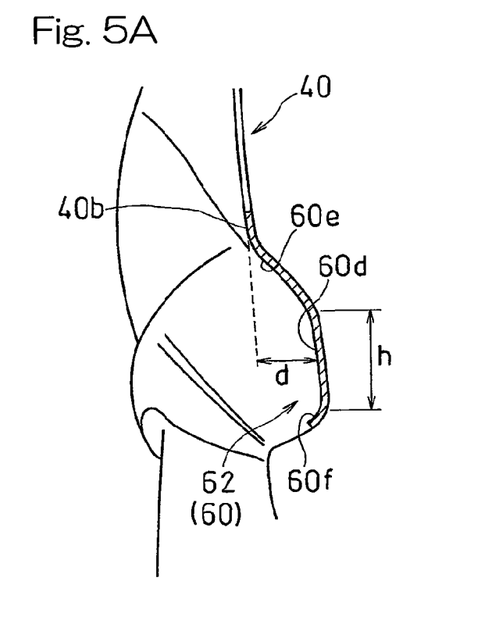
FIG. 5A is a cross-sectional view taken along the line VA-VA in FIG. 4.
Figure 5B:
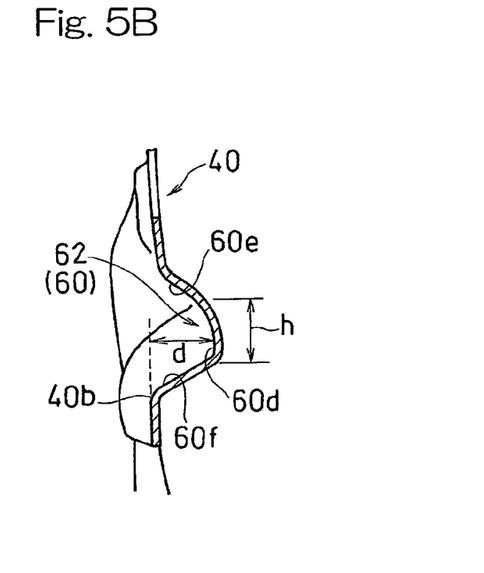
FIG. 5B is a cross sectional view taken along the line VB-VB in FIG. 4.

In the front half portion 62 shown in FIGS. 5A and 5B, the transverse sectional shape of the guide groove 60 is of a substantially trapezoidal shape with the upper groove face 60*e* oriented diagonally downwardly and outwardly, the lower groove face 60*f* oriented diagonally upwardly and outwardly, and the bottom face 60*d* oriented outwardly while the up and down dimension or vertical dimension h of the bottom face 60*h* gradually decrease in the rearward direction.

Figure 5C:
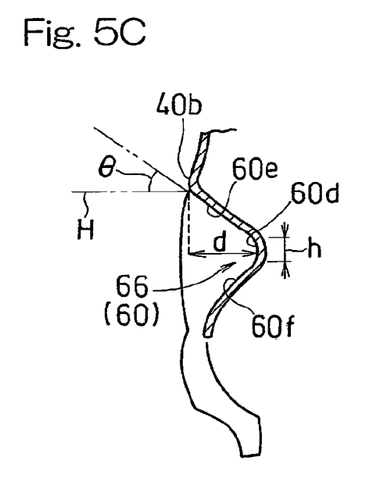
FIG. 5C is a cross sectional view taken along the line VC-VC in FIG. 4.
Figure 5D:
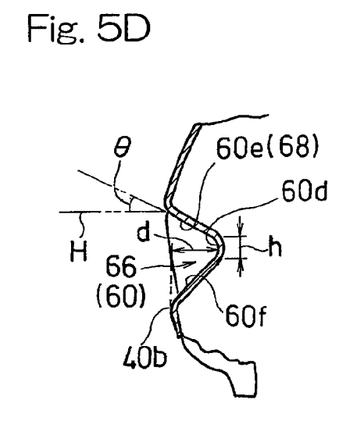
FIG. 5D is a cross sectional view taken along the line VD-VD in FIG. 4.

In the connecting portion 66 shown in FIG. 5C and the rear half portion 64 shown in FIG. 5D, the guide groove 60 has the transverse sectional shape representing a substantially V-shaped configuration with the upper groove face 60*e* oriented diagonally downwardly and outwardly, the lower groove face 60*f* oriented diagonally upwardly and outwardly and the bottom face 60*d* of a small up and down dimension h oriented outwardly, as is the case with the front half portions 62.

The guide groove 60 on each side of the motorcycle body has a depth d, as measured in a direction widthwise of the motorcycle body, which depth d is so chosen that as best shown in FIGS. 5A and 5B, in the front half portion 62 thereof, the depth d of the front half portion 62 increases gradually from the front end 60*a* (best shown in FIG. 4) in the direction rearwardly of the motorcycle with the maximum depth d being attained at the deepest groove area 72 in the vicinity of the connecting portion 66 best shown in FIG. 5C and that in the rear half portion 64 as shown in FIG. 5D, the depth d of the rear half portion 64 decreases gradually from the deepest groove area 72 in the direction rearwardly of the motorcycle body with the guide face 68 formed at a location rearwardly of the deepest groove area 72 of the guide groove 60, which guide face 68 includes the upper groove face 60*e* having the inner surface oriented laterally outwardly and downwardly. The bottom 60*b* of the guide groove 60 is, as clearly shown in FIG. 2, inclined outwardly in the direction widthwise of the motorcycle body towards the rearward direction. In other words, the angle θ defined by the guide face 68 relative to the horizontal plane H shown in FIG. 5D decreases gradually towards the rearward direction.

As shown in FIG. 2, a portion of the fairing 40 in the vicinity of the front end 40*a* is so formed as to represent a streamlined shape, flaring outwardly in a direction widthwise of the motorcycle body gradually from the front end 40*a* in the direction rearwardly of the motorcycle body. More specifically, the motorcycle widthwise outer end face 40*b* of the fairing 40 is so shaped that a portion thereof from the front end 40*a* to a point of inflection I is steeply flared outwardly and the remaining portion ranging rearwardly from the point of inflection I is moderately flared outwardly. In the illustrated embodiment, the guide groove 60 is formed at a location rearwardly of the point of inflection I and the deflecting face 70 is defined forwardly of the point of inflection I with respect to the direction parallel to the longitudinal sense of the motorcycle. Accordingly, the guide groove 60 has a front end positioned at a location sufficiently distant from the longitudinal center line C of the motorcycle body in a direction laterally of the motorcycle body. In other words, the front end of the guide groove 60 is set to assume the position somewhat rearwardly of the front end 40*a* of the fairing 40 and considerably distant from the front end 40*a* in the direction widthwise of the motorcycle.

Figure 6A:
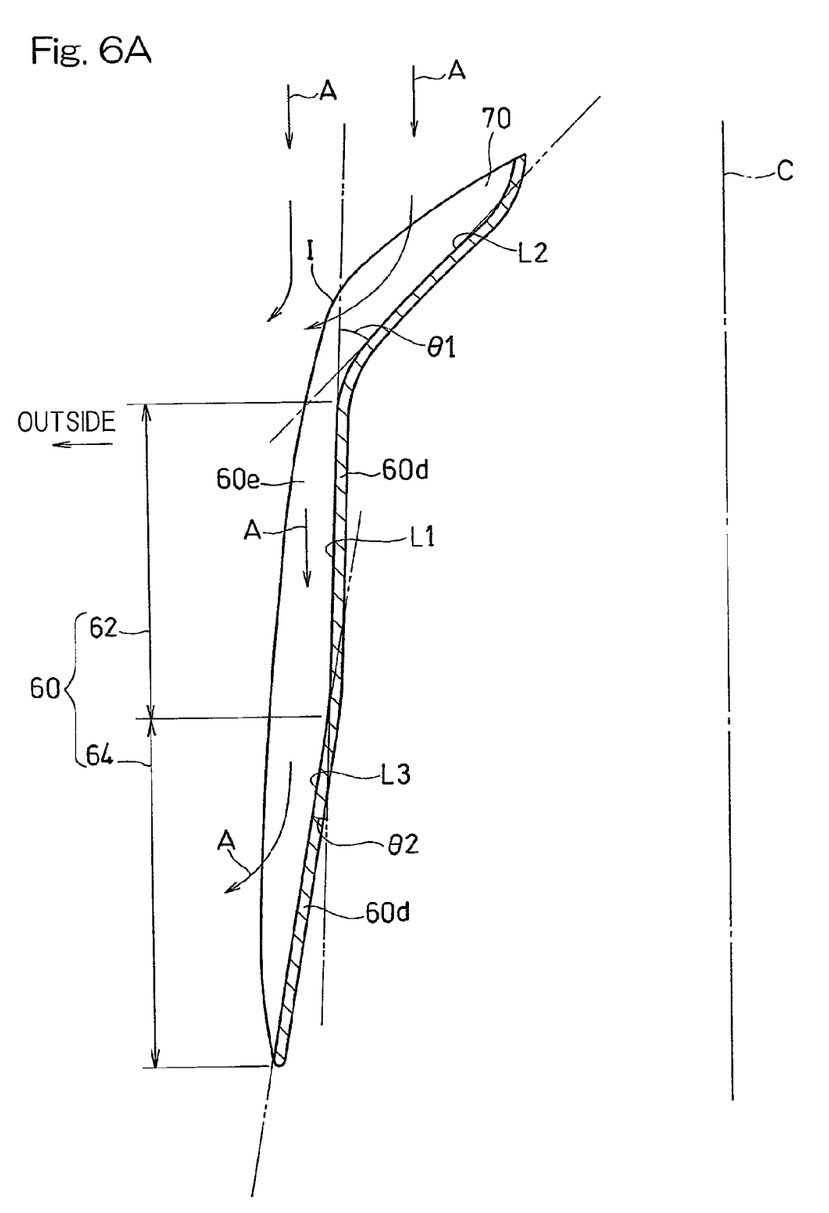
FIG. 6A is a cross sectional view taken along the line VIA-VIA in FIG. 4.
Figure 6B:
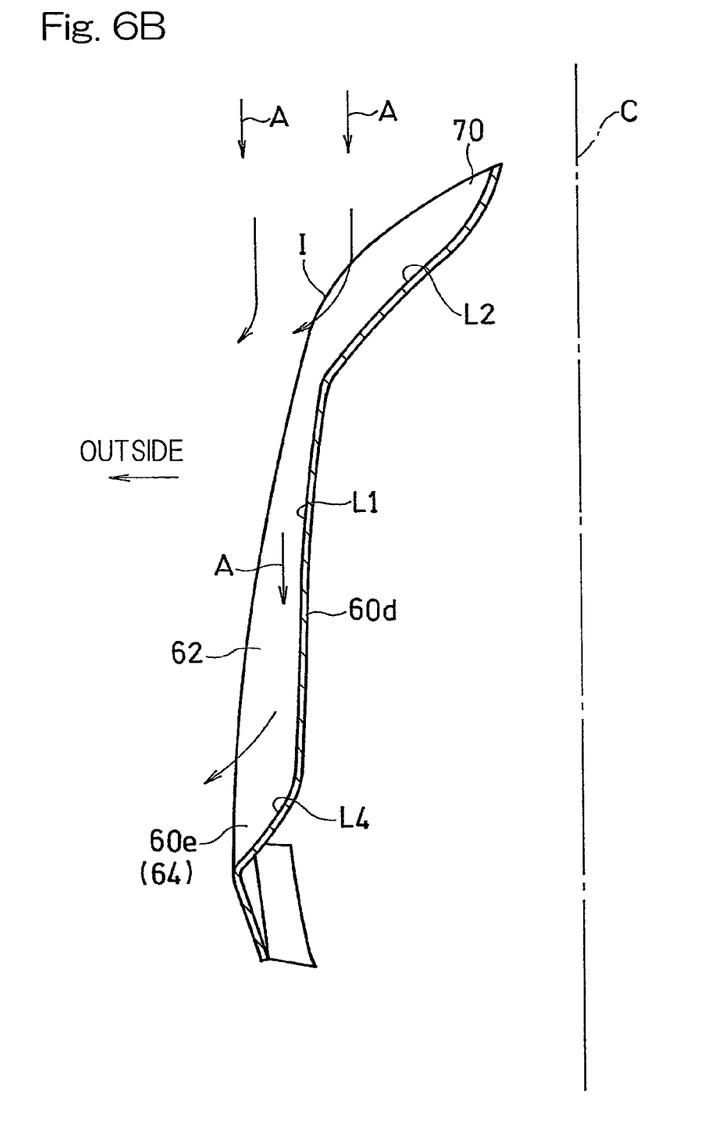
FIG. 6B is a cross sectional view taken along the line VIB-VIB in FIG. 4.

FIG. 6A is a cross sectional view taken along the generally V-shaped line VIA-VIA in FIG. 4, which line passes a lower edge of the deflecting surface 70 and, the deepest area of the guide groove 60, that is, the bottom face 60*d* of the front half portion 62 and of the rear half portion 64. FIG. 6B is a cross sectional view taken along the straight line VIB-VIB in FIG. 4, which line passes the lower edge of the deflecting surface 70 and the bottom face 60*d* of the front half portion 62.

As best shown in FIG. 6A, a first line L1 connecting the deepest area (bottom face 60*d*) in the front half portion 62 in a direction parallel to the longitudinal sense of the motorcycle extends parallel to the longitudinal center line C of the motorcycle body. In other words, in the front half portion 62 of the guide groove 60 on each side of the motorcycle body, the incoming air A is guided in a direction substantially parallel to the longitudinal sense of the motorcycle. A second line L2 connecting the deepest areas 70*a* of the deflecting surface 70, as best shown in FIG. 4, in a direction parallel to the longitudinal sense of the motorcycle flares markedly in a direction laterally outwardly of the motorcycle body along a longitudinal sense of the guide groove 60 in the rearward direction and is, after having been inflected, connected to the first line L1 of the front half portion 62 of the guide groove 60 at a location in the vicinity of the point of inflection I. The first and second lines L1 and L2 cooperate with each other to define an angle θ1 that is preferably within the range of 30 to 60° and, more preferably, within the range of 35 to 50°, but in the practice of the preferred embodiment, the angle θ1 is chosen to be 42°. Accordingly, a portion of the incoming air A then flowing towards the front half portion 62 of the guide groove 60 on each side of the motorcycle body is shoved in a direction laterally outwardly of the motorcycle body by another portion of the incoming air A then guided by the deflecting surface 70 and, therefore, the incoming air A flowing in and along the respective guide groove 60 can be reduced.

A third line L3 connecting the deepest areas (bottom face 60*d*) of the rear half portion 64 of the guide groove 60 on each side of the motorcycle body in a direction parallel to the longitudinal sense of the motorcycle flares moderately in a direction outwardly of the motorcycle body along the longitudinal sense of the guide groove 60 in the rearward direction, and this third line L3 has a front end that is, after having been inflected, connected to the first line L1. The angle θ2 formed between the first and third lines L1 and L3, when viewed from the vertical direction, is preferably within the range of 5 to 20° and, more preferably, within the range of 7 to 15°, but in the practice of the illustrated embodiment, the angle θ2 is chosen to be 10°. Accordingly, that portion of the incoming air A then flowing along the front half portion 62 of the guide groove 60 on each side of the motorcycle body is further guided by the rear half portion 64 so as to flow from the respective guide groove 60 in a direction laterally outwardly of the motorcycle body.

As shown in FIG. 6B, a fourth line L4 connecting the upper groove face 60*e* in the rear half portion 64 in the direction parallel to the longitudinal sense of the motorcycle flares markedly in the direction laterally outwardly of the motorcycle body along the longitudinal sense of the guide groove 60 in the rearward direction. Accordingly, a portion of the incoming air A guided rearwardly along the front half portion 62 of the guide groove 60 on each side of the motorcycle body is guided by the upper groove face 60*e* in the vicinity of the apex P (as best shown in FIG. 1) of the respective guide groove 60 so as to be shoved in a direction laterally outwardly of the motorcycle body, and as a result, the incoming air A flowing towards the rider's leg past the rear half portion 64 of the respective guide groove 60 can be reduced.

Thus, as best shown in FIG. 6A, the guide groove 60 provided on each side of the motorcycle body, as compared with the incoming air A being guided along a smooth curve, makes it possible for the deflecting surface 70 and the front and rear half portions 62 and 64 of the respective guide groove 60 to guide the incoming air A by the utilization of the three faces having the angles different from each other. Accordingly, the incoming air A flowing towards the rider's leg and the rider's upper body can be effectively reduced. Also, since as best shown in FIG. 3, the rear half portion 64 of the V-shaped guide groove 60 extends gradually downwardly towards the rear direction, the incoming air A is shoved by the upper groove face 60*e* of the rear half portion 64 as shown in FIG. 6B in a direction laterally outwardly of the motorcycle body and is then guided, as shown by the arrow in FIG. 3, at the position forwardly of and in the vicinity of the associated grip 58 so as to flow in the direction laterally outwardly of the motorcycle body while having a width in the up and down direction. Hence, the incoming air A flowing towards the rider's leg and the rider's upper body can be further effectively reduced over the wide range in the up and down direction.

Also, if the I-shaped configuration is employed, in which the front half portion 62 and the rear half portion 64 extend in line with each other, a rear end Q of the guide groove 60, which is encircled by the circle in FIG. 3, is formed at an upper edge of the fairing 40. Therefore, since the rear half portion 64 will become short as compared with that where the V-shaped configuration is employed, the groove depth will abruptly change at a rear end portion, resulting in the stress concentration being apt to take place. In contrast thereto, since in the embodiment now under discussion the guide groove 60 is of the V-shaped configuration, the change in groove depth can be made moderate by a quantity corresponding to the length of the rear half portion 64 of the guide groove 60 that can be increased, and, therefore, the stress concentration can be relieved to increase the rigidity of the fairing 40. As a result, by way of example, there is no need to reinforce the fairing 40 locally and/or increase the wall thickness at a location in the vicinity of the guide groove 60.

Figure 7:
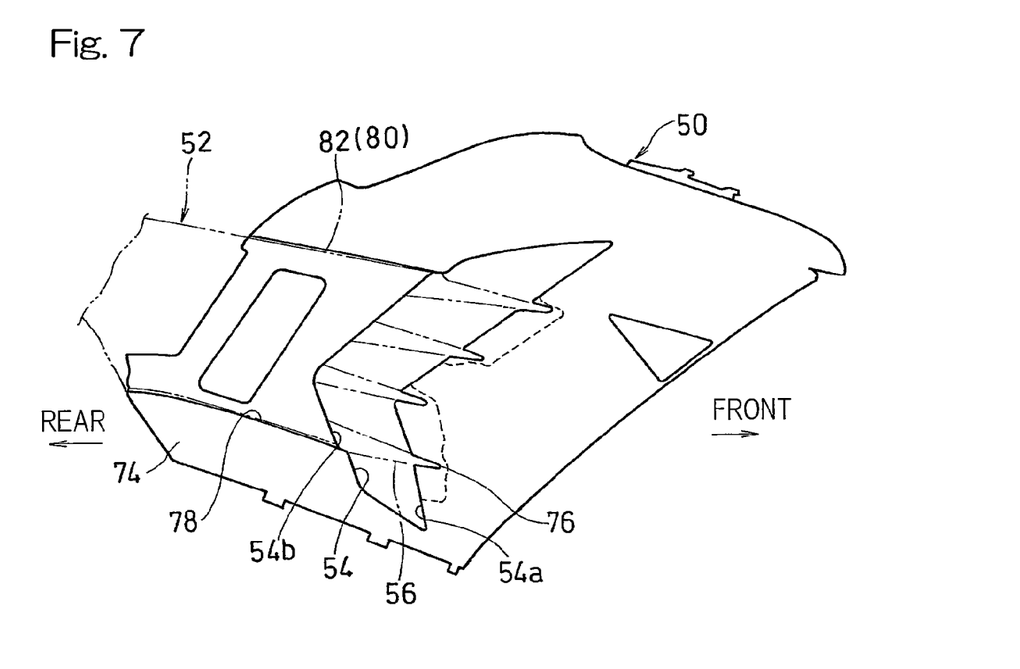
FIG. 7 is a side view showing one of side cowls employed in the motorcycle.

As shown in FIG. 1, the side panel 50 on each side of the motorcycle body is formed at a center portion, as viewed from side, with the air discharge opening 54 of a substantially V-shaped configuration having a projected portion oriented rearwardly. As shown in FIG. 7 illustrating a side view of a side panel 50 alone, the air discharge opening 54 has a front edge portion 54*a* formed with a plurality of, for example, four in the instance as shown, slits 76 adapted to receive therein the corresponding rectifying fins 56. Each of those slits 76 is in the form of a cut or a groove continued to the air discharge opening 54. A recess 78, which is depressed in a direction inwardly of the motorcycle body and in which the corresponding knee grip cover 52 is disposed, is formed in a region ranging from a center area of the rear edge portion 54*b* of the air discharge opening 54 to a rear edge of the side panel 50 on each side of the motorcycle body. The bulged portion 74 referred to previously extends from a lower area of the front edge of the side panel 50 to a rear edge lower area of the side panel 50 past a position beneath the air discharge opening 54 and a position below the recess 78.

Figure 8:
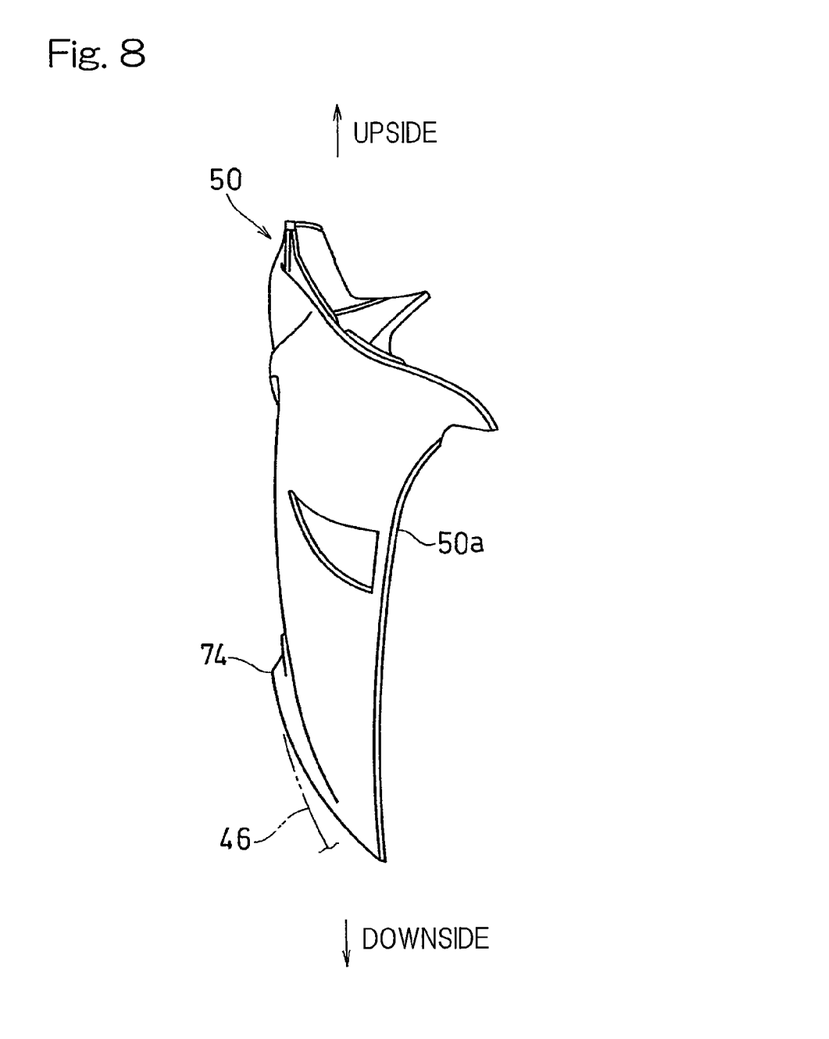
FIG. 8 is a front elevational view showing the side cowl employed in the motorcycle.

Referring to FIG. 8, the bulged portion 74 has a lower area so set as to have a larger bulging amount than that at an upper area thereof, and the lower area that is most bulged outwardly of the motorcycle body is smoothly continued to the engine covering 46. Also, as best shown in FIG. 2, the bulged portion 74 is bulged gradually outwardly towards the rear thereof and the bulging amount becomes largest at the rear area that is positioned forwardly of and in the vicinity of the rider's leg as shown in FIG. 1.

Figure 9:
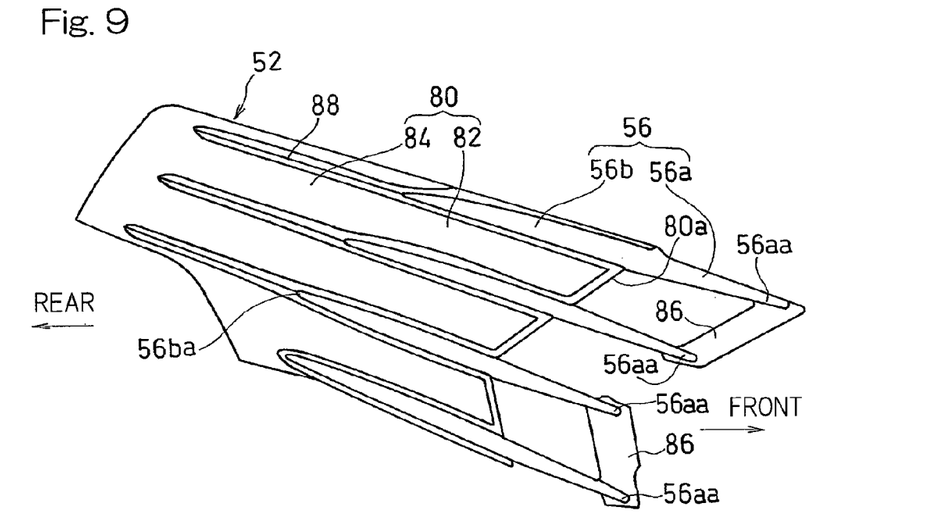
FIG. 9 is a side view showing one of knee grip covers employed in the motorcycle.

As shown in FIG. 9, the knee grip cover 52 has a generally rectangular covering body 80 when viewed from side, and the covering body 80 has a front edge portion 80*a* of a shape substantially matching with the shape of the rear edge portion 54*b* of the air discharge opening 54. The covering body 80 includes a rectifying portion 82 that is accommodated within the recess 78 (best shown in FIG. 7) of the side panel 50 on each side of the motorcycle body, and a knee grip portion 84 extending in a direction rearwardly of the rectifying portion 82 and having a dimension in the up and down direction that is smaller than that of the rectifying region 82.

The rectifying portion 82 referred to above is formed integrally with respective rear half portions 56*b* of the four rectifier fins 56 by means of a molding technique. Respective front half portions 56*a* of the rectifying fins 56 are so formed as to protrude forwardly from a front edge portion 80*a* of the covering body 80. Of those four rectifier fins 56, the upper-most rectifier fin 56 and the next adjacent rectifier fin 56 have respective front end portions 56aa connected together by means of a reinforcement member 86. Similarly, respective front end portions 56aa of the lowermost rectifying fin 56 and the next lowermost rectifying fin 56 are connected together by means of another reinforcement member 86. Each of the rear half portions 56b of the rectifying fin 56 is so formed as to protrude outwardly from an outer surface of the rectifying portion 82. Furthermore, the knee grip portion 84 has an outer surface formed with a groove 88 that is continued to a rear end 56ba of the rectifier fin 56 to thereby improve the appearance of the motorcycle. In the embodiment now under discussion, respective grooves 88 are formed, which are continued respectively to the upper three rectifier fins 56.

Figure 10:
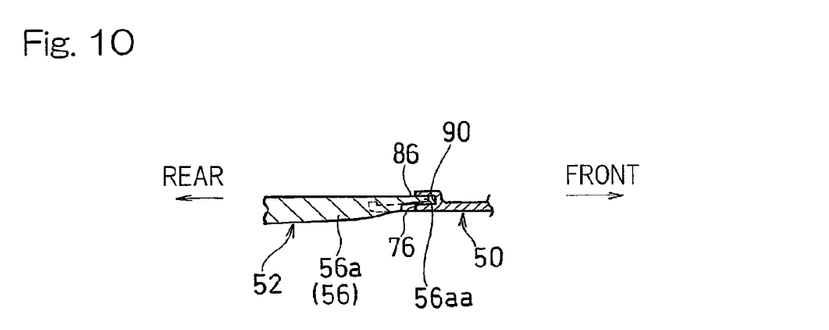
FIG. 10 is a horizontal sectional view showing a connection between a slit in the side cowl and a rectifier fin of the knee grip cover.

As shown in FIG. 7, the knee grip cover 52 is such that the rectifying portion 82 is mounted inside the recess 78 in the side panel 50 so as to permit the covering body 80 to define the outer surface of the motorcycle body, and, also, as shown in FIG. 10, the front end portions 56aa of the associated rectifier fins 56 are inserted into the corresponding slits 76. At this time, the rectifying members 86 for the front end portions 56aa of the rectifier fins 56 are engaged in corresponding engagement grooves 90 formed inside of the side panel 50. In other words, in a condition in which the knee grip cover 52 is mounted on the side panel 50, the front end portions 56aa of the adjoining rectifier fins 56 and the slits 76 are reinforced by the reinforcement members 86 that are positioned on the side of an inner surface of the side panel 50. Accordingly, during the travel, it is possible to avoid the rectifier fins 56 from being vibrated. Also, since the respective front end portions 56aa of the rectifier fins 56 are inserted into the associated slits 76, the front end portions 56aa of the rectifier fins 56 does not protrude outwardly from an outer side surface of the side panel 50 and, therefore, owning to the front end portions 56aa, it is possible to suppress the occurrence of a turbulent flow of the incoming air A along the outer surface of the fairing 40 best shown in FIG. 1.

In the construction hereinabove described, as shown in FIG. 2, the incoming air A coming in the front half portion 62 of the guide groove 60 towards the grip 58 is deflected at the position forwardly of and in the vicinity of the grip 58. Accordingly, as compared with that deflected at a location in the vicinity of the front portion of the guide groove 60, that is, the front end 40a of the fairing 40, the incoming air A flowing within the guide groove 60 can be effectively urged in a direction laterally outwardly of the motorcycle body at the position forwardly of and in the vicinity of the grip 58 and, therefore, the incoming air A1 flowing outside the guide groove 60 can be deflected in the outward direction, thus alleviating the possible impingement of the incoming airs A and A1 upon the rider's arm HA. Also, since the rear half portion 64 of the guide groove 60 is inclined rearwardly downwardly, the incoming air A within the guide groove 60 can be guided diagonally downwardly and rearwardly and, therefore, the incoming air A can be guided far away from the rider's arm HA.

As shown in FIG. 4, if a portion of the incoming air A guided by and along the guide groove 60 is guided towards the rear half portion 64, it is possible to guide that portion of the incoming air A so as to flow far wary from the grip 58. In addition, since the front half portion 62 of the guide groove 60 extends somewhat rearwardly upwardly or in the direction substantially parallel to the longitudinal sense of the motorcycle body and does not descend rearwardly downwardly, the automotive vehicle will not be looked heavy footed. Also, since the guide face 68 is provided in the V-shaped rear half portion 64, it is possible to guide the incoming air A to be deflected at the position forwardly of and in the vicinity of the grip 58 and then to guide in a direction laterally outwardly by this guide face 68. As a result, the possibility of the incoming air A impinging upon the rider's arm can alleviated.

As shown in FIGS. 5A and 5B, in the front half portion 62 of the guide groove 60, the depth d of the guide groove 60 gradually increases in correspondence with the gradual bulging of the outer end portion 40b of the fairing 40 in the rearward direction. Therefore, the incoming air A guided by and along the guide groove 60 is prevented from flowing in the direction laterally outwardly of the motorcycle body before it reaches the deepest groove area 72 (connecting portion 66), as best shown in FIG. 5C, and is suddenly guided so as to flow in the direction laterally outwardly of the motorcycle body as it flows past the connecting portion 66 best shown in FIG. 4. Accordingly, the direction of flow of the incoming air A can be abruptly changed, thus alleviating the incoming air A from impinging on the rider's arm.

Also, by guiding the incoming air A, introduced into the rear half portion 64 of the guide groove 60, in the outward direction to keep the incoming air A, emerging outwardly from the guide groove 60, flowing away from the driver, the possible impingement of the incoming air A upon the rider's arm can be further alleviated.

In addition, the provision of the deflecting surface 70 forwardly of the guide groove 60 is effective to minimize the incoming air A entering the guide groove 60 and, as a result, the incoming air A directed towards the rider's arm is also minimized, thus alleviating the possible impingement of the incoming air A upon the rider's arm.

Since as shown in FIG. 1, the rear end 60b of the guide groove 60 is inclined downwardly beyond the rider's knee K, the possible impingement of the incoming air A upon not only the arm HA, but also the knee K can be alleviated. Further, since the side panel 50 has the bulged portion 74 effective to avoid the impingement of the incoming air A upon the rider's lower thigh, the possible impingement of the incoming air A upon the knee K can be further alleviated.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, in describing the preferred embodiment, the guide groove 60 on each side of the motorcycle body has been shown and described as formed so as to represent the generally inverted V-shaped configuration, it may be so formed as to represent an arcuate shape or a linear shape.

Also, in view of the capability of providing a good wind shielding effect, the present invention can be equally applied to any saddle-riding type automotive vehicle that requires or is formed with the fairing. In addition, the present invention can be equally applied not only to any saddle-riding type automotive vehicle which makes use of a combustion engine as the drive source, but also to any saddle-riding type automotive vehicle utilizing an electrically driven motor.

Accordingly, such changes and modifications are, unless they depart from the scope of the present invention as delivered from the claims annexed hereto, to be construed as included therein.

REFERENCE NUMERALS

14 . . . Handlebar
40 . . . Fairing

54 ... Air discharge opening
56 ... Rectifying fin
58 ... Grip
60 ... Guide groove
62 ... Front half portion
64 ... Rear half portion
66 ... Connecting portion
68 ... Guide face
70 ... Deflecting surface
72 ... Deepest groove area
74 ... Bulged portion
76 ... Slit
A ... Incoming air

What is claimed is:

1. A saddle-riding type automotive vehicle which comprises:
   a fairing enclosing a front region of the automotive vehicle; and
   a guide groove defined in an outer side surface of the fairing and extending from a position in the vicinity of a front end of the fairing to a position below a grip of a handlebar then held at a zero steering angle;
   in which the guide groove is operable to guide the incoming air towards a position forwardly of and in the vicinity of the grip in a direction parallel to a longitudinal sense of the automotive vehicle and then to change the flow of the incoming air at the position forwardly of and in the vicinity of the grip to thereby guide it outwardly of the automotive vehicle.

2. The saddle-riding type automotive vehicle as claimed in claim 1, in which in a transverse section perpendicular to the longitudinal sense of the automotive vehicle, a vehicle widthwise outer end face at a site in the fairing, where the guide groove is formed, is bulged in a direction laterally outwardly and gradually from a front end thereof in a rearward direction;
   in which the depth of the guide groove as measured in a direction widthwise of the automotive vehicle is so chosen that the depth of a front half portion of the guide groove increases gradually from a front end in the direction rearwardly of the automotive vehicle with the maximum depth being attained at the deepest groove area positioned forwardly of and in the vicinity of the grip and that the depth of a rear half portion of the guide groove decreases gradually from the deepest groove area in the direction rearwardly of the motorcycle body; and
   in which a guide face is formed at a location rearwardly of the deepest groove area of the guide groove, which guide face is oriented outwardly downwardly.

3. The saddle-riding type automotive vehicle as claimed in claim 2, further comprising a deflecting surface formed forwardly of the guide groove, the deflecting surface extending diagonally rearwardly from an inner side towards an outer side and depressed rearwardly.

4. The saddle-riding type automotive vehicle as claimed in claim 2, in which the guide groove is so formed as to represent a shape generally similar to the inverted shape of a figure "V" when viewed from side;
   in which the front half portion of the guide groove extends from a front end of the guide groove towards the position forwardly of and in the vicinity of the grip,
   in which the rear half portion of the guide groove is so inclined as to form an obtuse angle relative to the front half portion;
   and further comprises a connecting portion connecting the front half portion and the rear half portion together and having an apex of the inverted V-shape; and
   in which an inner surface of at least the rear half portion of the guide groove has the guide face oriented outwardly downwardly.

5. The saddle-riding type automotive vehicle as claimed in claim 4, in which in the rear half portion a bottom of the guide groove is inclined laterally outwardly of the automotive vehicle in a rearward direction.

6. The saddle-riding type automotive vehicle as claimed in claim 4, in which a rear portion of the guide groove is oriented downwardly of a rider's knee.

7. The saddle-riding type automotive vehicle as claimed in claim 1, in which the fairing includes a bulged portion bulged outwardly to prevent the incoming air from impinging on a rider's lower thigh.

8. The saddle-riding type automotive vehicle as claimed in claim 1, in which an air discharge opening is formed in a side portion of the fairing;
   a rectifying fin is provided so as to bridge over the discharge opening to rectify and guide a discharged wind from the air discharge opening in a rearward direction across the air discharge opening; and
   the rectifying fin has a front end inserted in a slit provided in an edge portion of the air discharge opening.

* * * * *